United States Patent [19]

LaRose et al.

[11] 4,269,335
[45] May 26, 1981

[54] MOTORCYCLE LUGGAGE RACK

[75] Inventors: Claude LaRose, Duvernay Laval; Jacques Gagnon, St-Lambert, both of Canada

[73] Assignee: Triangle Accessoires de Motocyclettes Ltee., St. Léonard, Canada

[21] Appl. No.: 131,541

[22] Filed: Mar. 18, 1980

[51] Int. Cl.³ .............................................. B62J 7/04
[52] U.S. Cl. ................................. 224/31; 224/32 A; 224/33 R
[58] Field of Search ............ 224/273, 31, 32 R, 32 A, 224/33 R, 40, 282; 280/769, 289 A

[56]  References Cited
U.S. PATENT DOCUMENTS

| 1,121,580 | 12/1914 | Burkett et al. | 224/31 |
| 2,892,577 | 6/1959 | Chew | 224/31 |
| 3,850,353 | 11/1974 | Foulds | 224/31 |

FOREIGN PATENT DOCUMENTS

| 73056 | 2/1948 | Norway | 224/31 |
| 573607 | 11/1945 | United Kingdom | 224/33 |

Primary Examiner—Steven M. Pollard
Attorney, Agent, or Firm—Robic, Robic & Associates

[57]  ABSTRACT

A motorcycle luggage rack having a platform for carrying luggage and a support beneath the platform for supporting the same. The support is adapted to be fixed to the motorcycle. A pair of spaced apart links pivotably connects each side of the platform to the support so that the platform can be moved between rear and forward positions. A lock member or stop, locks the platform in either position.

6 Claims, 6 Drawing Figures

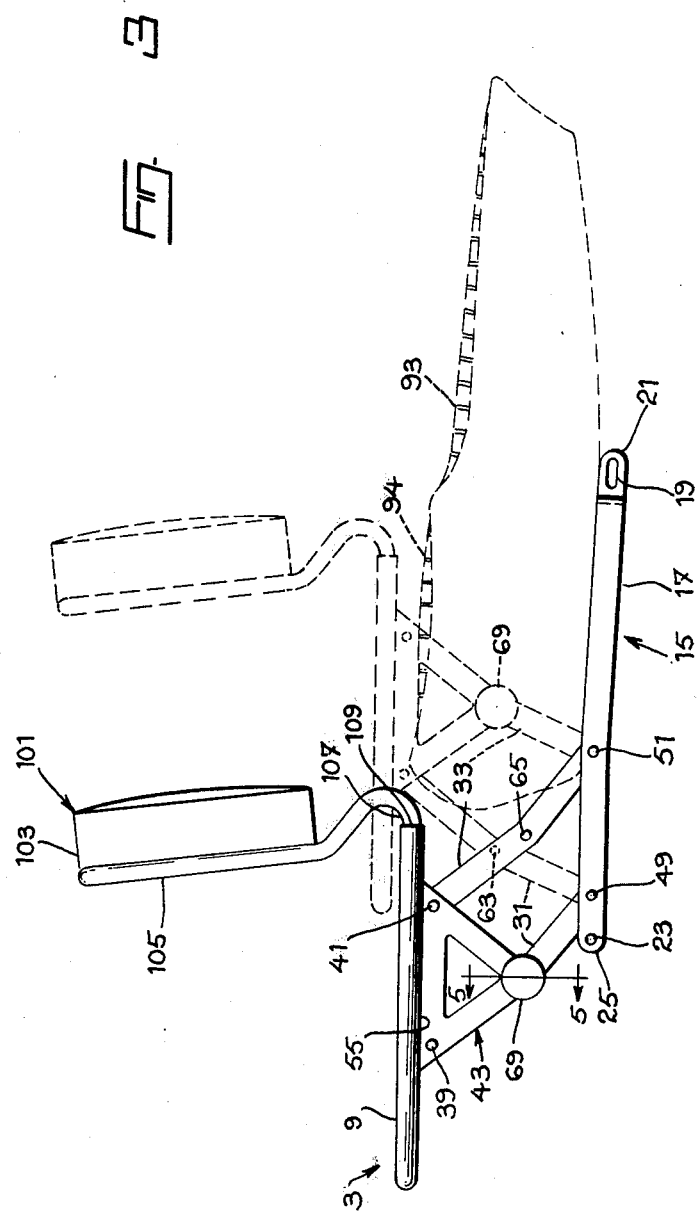

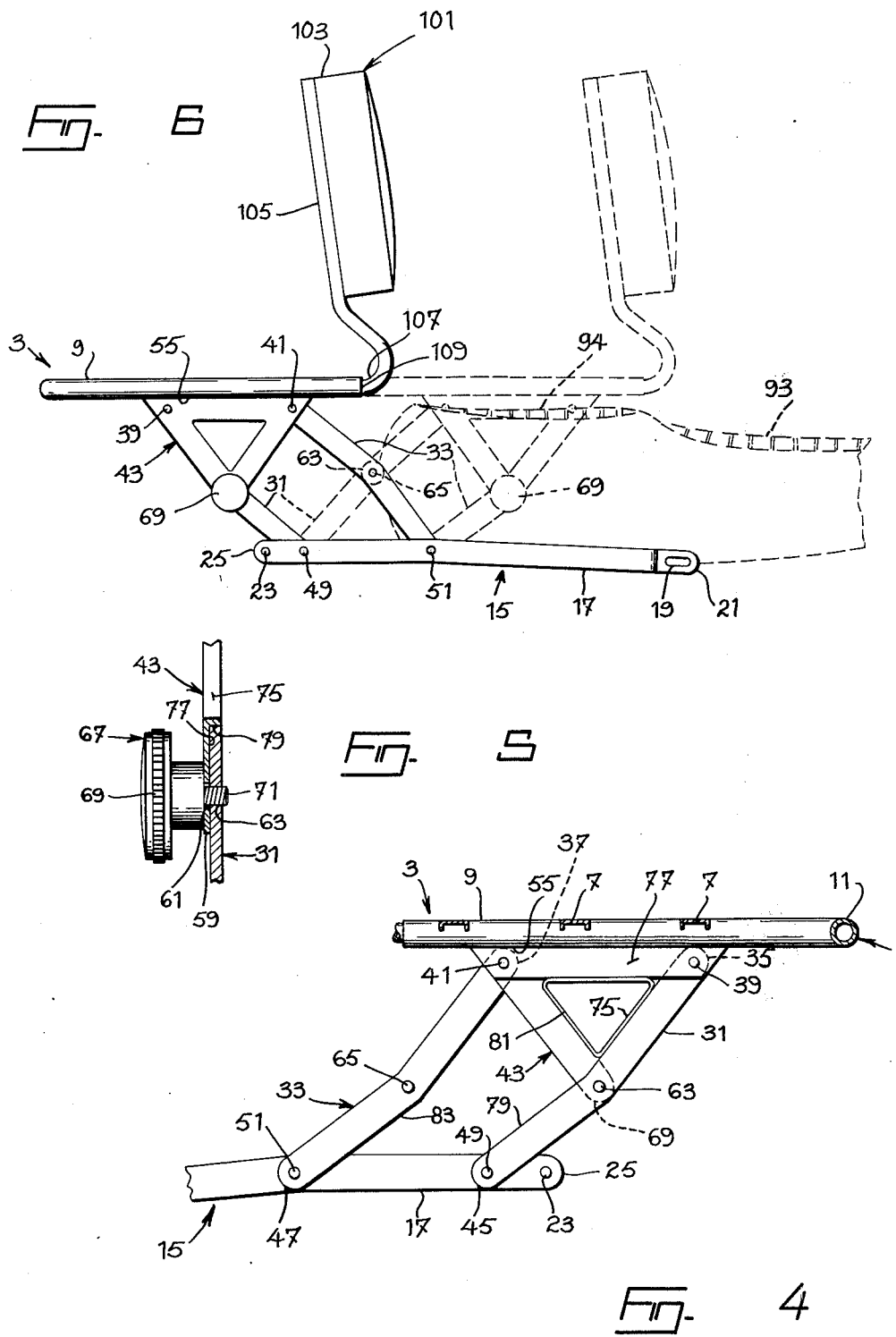

MOTORCYCLE LUGGAGE RACK

The present invention relates to an improved luggage rack for a motorcycle.

Luggage racks for motorcycles are well known as shown in U.S. Pat. No. 3,850,353 for example. Normally, each of these known luggage racks are fixed in one position at the rear of motorcycle, behind the rear wheel axle. In this position, the rack is far enough away from the driver so as to allow room for a passenger to ride behind the driver. This location of the luggage rack can however lead to unstable, and thus dangerous, operation of the motorcycle when the rack is heavily loaded, there is no passenger, and the motorcycle is accelerated. The heavy load on the rack behind the rear wheel axle adds a turning moment about the rear wheel axle which, during heavy acceleration could lead to the motorcycle flipping up and back about its rear wheel axle.

A first object of the present invention is to provide a motorcycle luggage rack which can be moved between a front and a rear position. In its front position, which is to be used when there is no passenger, the rack is located where the passenger would normally sit, thus bringing the load on the rack over the rear wheels and closer to the center of gravity of the vehicle and thereby minimizing unstable operating conditions. When a passenger is to be carried, the rack then can be easily moved back to a normal rear possition locating the load behind the rear wheel axle and making room for the passenger.

Another object of the present invention is to provide a luggage rack of the above mentioned type, which is simple both in construction and in operation owing to the presence of locking means on the rack for quickly and accurately locating, and then locking the same in the front or rear positions.

In accordance with the invention, the above objects are achieved with a motorcycle luggage rack comprising platform means for carrying luggage and support means spaced below the platform means for supporting the platform means. The support means comprises means for use in connecting the rack to a motorcycle. The luggage rack also comprises means for movably connecting the platform means to the support means so that the platform means can move between a rear posistion and a forward position relative to the support means. These connecting means include a pair of spaced apart links extending down from each side of the platform to the support means, each link being pivotably connected to the platform means and support means. The luggage rack further comprises locking means for locking the platform in either position relative to the support means.

Preferably, the locking means include a lock member forming part thereof, which is located on each side of the rack. Each lock member lies adjacent the links and is fixed to one of the platform or support means. The locking means also includes means for detachably connecting the lock member to a link in either position of the platform means.

The invention will now be better understood with reference to the following non-restrictive description of one embodiment of a luggage rack according to the invention, taken in connection with the accompanying drawings in which:

FIG. 3 is a side view of the luggage rack shown in FIGS. 1 and 2, illustrating the rear and front positions thereof in solid and dash lines respectively;

FIG. 4 is a longitudinal cross section view of the luggage rack shown in FIG. 3;

FIG. 5 is a cross-section view taken along line 5—5 of FIG. 3; and

FIG. 6 is a side view of a possible variant for the luggage rack already shown in the same positions on FIG. 3.

Figure 2:
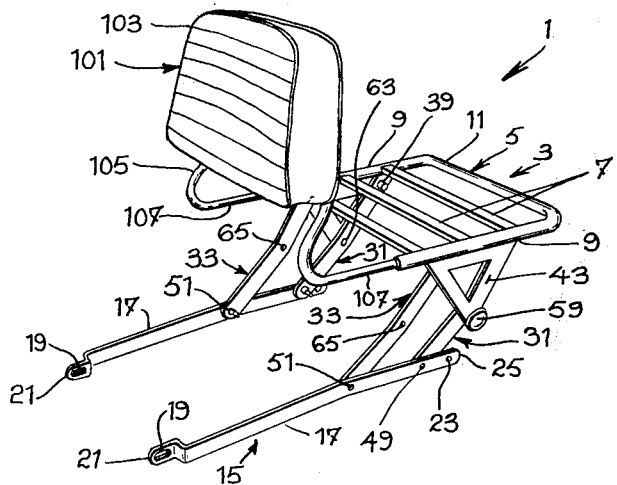
FIG. 2 is a perspective view of the luggage rack shown in FIG. 1.

The luggage rack 1 which is shown in FIG. 2, first comprises a platform 3 for carrying luggage thereon. The platform 3 comprises a tubular outer frame member 5 having a generally U-shaped appearance with spaced-apart cross-bars 7 extending between the legs 9 of the frame 5. The cross-bars 7 are generally parallel to the base 11 of the frame 5.

Figure 1:
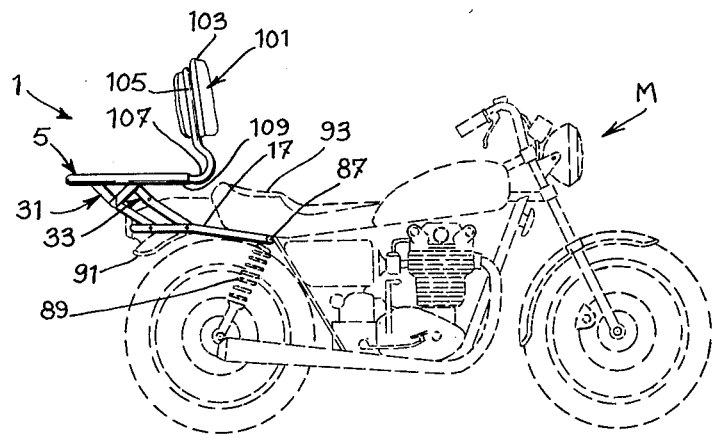
FIG. 1 is a side view of a motorcycle with a luggage rack according to the present invention mounted thereon.

The luggage rack 1 also comprises a support 15 spaced beneath the platform 3 for supporting the platform. The support 15 comprises a pair of generally parallel support arm 17. A slot 19 is provided at the front end 21 of each arm 17 for use in attaching the rack to a motorcycle M as shown in FIG. 1. A hole 23 can be provided at the rear end 25 of each arm 17 for further use in attaching the rack to the motorcycle.

Connecting means movably connect the platform 3 to the support 15. These connecting means comprise a pair of spaced-apart links 31 and 33 extending down from each side of platform 3 to the support 15. The upper ends 35 and 37 of the links 31 and 33 respectively are pivotably connected by pivot members 39 and 41 respectively to the platform 3. More particularly, the upper link ends 35 and 37 of each link pair are pivotably connected to a lock member 43 which is fixed to the leg 9 and extends down therefrom to lie adjacent the links 31 and 33. The lower ends 45 and 47 of the links 31 and 33 respectively are pivotably connected by pivot members 49 and 51 respectively to an arm 17 of the support 15. The two pairs of pivoted links 31 and 33 permit the platform 3 to swing about lower pivot members 49 and 51 and upper pivot members 39 and 41 between front and rear positions relative to the support 15 while remaining relatively parallel to the latter.

Means are provided for locking the platform 3 in either the front or rear positions. These locking means include the lock member 43 fixed to each leg 9. Each lock member 43 comprises a generally triangular-shaped plate member the base edge 55 of which is fixed to the underside of the leg 9 of the frame 5 by welding or other suitable means. The member 43 extends downwardly, lying adjacent the links 31 and 33, toward the support arm 17 located beneath the leg 9. The apex 59 of the member 43 is located about halfway between the platform 3 and support 15 and a through hole 61 is provided in the member adjacent the apex 59 as shown in FIG. 5. Each link 31 and 33 has a through hole 63 and 65 respectively therein approximately midway between its ends. The holes 63 and 65 preferably are threaded. With the platform 3 located in its rear position, the hole 61 in the member 43 is aligned with the hole 63 in the rear link 31, and with the platform 3 located in its front position, the hole 61 in the member 43 is aligned with the hole 65 in the front link 33. A locking bolt 67, having an enlarged head 69 and a threaded shank 71, is passed through the hole 61 in the member 43 and screwed in the hole 63 or 65 in the link 31 or 33, depending on the position of the platform 3, to lock the latter in place.

Instead of using a locking bolt 67, a nut, lock washer and bolt assembly may be used to lock the platform means in either position with the holes 63 and 65 left unthreaded.

Advantageously, the luggage rack 1 further comprises stop means for locating the platform 3 in either its front or rear position. These stop means include a first rib or flange element 75 extending inwardly from the inner surface 77 of each plate member 43. The rib 75 is angled to lie on the inside side edge 79 of the rear link 31 when the platform 3 is in its rear position with the hole 61 in the member 43 aligned with the hole 63 in the link 31. The stop means also include a second rib or flange element 81 extending inwardly from the inner surface 77 of each plate member 43. The rib 81 is angled to lie on the inside side edge 83 of the front link 33 when the platform means 3 is in its front position with the hole 61 in the member 43 aligned with the hole 65 in the link 33 (see FIGS. 4 and 5).

In use, the luggage rack 1 is mounted on a motocycle M by attaching the front ends 21 of the support arms 17 to the motorcycle frame through bolts 87 attaching the motorcycle shock absorbers 89 to the frame as shown in FIG. 1. The bolts 87 pass through the slots 19 in the arms 17. The middle portions and/or the rear ends 25 of the arms 17 can also be attached by suitable bolts and brackets (not shown) either to the frame or to the rear licence plate mounting bracket secured onto the mudguard 91 of the motorcycle depending on the motorcycle structure. When riding alone on the motorcycle, the rider would move the platform 3 forwardly, to its front position, up slightly and over the rear portion of the seat 93 so as to locate any load on the platform means closer to the center of gravity of the motorcycle. The platform 3 is moved to its forward position by unscrewing the locking bolts 69 out of the holes 63 in the rear links 31 to unlock the platform and when swinging it forwardly about its pivot members 49 and 51 until the front stop ribs 81 on the stop plates 43 about the inside edges 83 of the front links 33 to limit the movement. When this occurs, the platform 3 is in its desired forward position with the holes 61 in the plates 43 now aligned with the holes 65 in the front links 33 so that the locking bolts 69 can be screwed into the holes 65 through the holes 61 to lock the platform in its front position.

If a passenger is also to ride on the motorcycle, the platform 3 is moved to its rear position, the rear stop ribs 75 locating the platform in its rear position where it is locked in place.

If desired, a back rest 101 can be mounted on the platform 3. The back rest 101 includes a back pad 103 mounted on a tubular frame 105. The frame 105 has two legs 107 extending rearwardly from its bottom portion. The legs 107 preferably are sized and spaced to slide into the open ends 109 of the arms 9 of the platform frame 5. Suitable means, not shown, can lock the legs 107 in place within the arms 9. Preferably, the position of the back rest 101 can be adjusted relative to the platform means 3 and the back rest can be locked in place in any adjusted position.

While the lock members 43 have been shown as being mounted on the platform, they can also be mounted on the support. Also, while the stop elements 75 and 81 have been shown as being part of the lock members 43, they can be mounted separately from the lock members 43, on their own support members on either the platform or the support.

As can been seen on the Figures, the links 31 and 33 movably connecting the platform 3 to the support 15 an slightly bent at approximately mid-length, that is at the same level as the apex 59 of the member 43 is located. This particular feature advantageously gives an additional versatility to the luggage rack 1 since it allows it to be used with any kind or shape of motocycle seat 93. Indeed, depending on the orientation given to the front, bent link 33, the platform 3 when located in its front position may be at the same level as, or at a higher level than when located in its rear position. If both links 31 and 33 are similarly bent and orientated in the same direction as in particular shown in FIG. 3, the platform 3 will stay in its front position where it stands above the seat 93, at a higher level than in its rear position where it stands behind the seat because of the dissymetry of the links. This arrangement can be used for example when the rear portion 94 of the seat 93 is raised and high. On the other hand, if both links 31 and 33 are similarly bent lent inversely orientated with respect to each other as shown in FIG. 6, the platform 3 with stay in its front position at the same level as in its rear position because of the perfect symmetry of the links. This arrangement can be used when the rear position 94 of the seat 93 is not too much raised.

To allow easy transformation of the luggage rack 1 from one possible arrangement of the links to the other one, the pivot members 41 and 51 of the front links 33 may advantageously consist of easily removable bolts and nuts to allow the consummer to interchange himself the orientation of the front links 31 with respect to the rear links 31.

We claim:

1. A luggage rack for a motorcycle, comprising:
   platform means for carrying luggage;
   support means spaced below the platform means for supporting the platform;
   means on the support means for connecting the support means to a motorcycle;
   means for movably connecting the platform means to the support means so that the platform means can move between a rear position and forward position relative to the support means, said connecting means including a pair of spaced apart links extending down from each side of the platform means to the support means, each link being pivotably connected to the platform means and to the support means; and
   means for locking the platform means in either position relative to the support means.

2. A luggage rack as claimed in claim 1 wherein the locking means comprise a lock member located on each side of the rack, each lock member lying adjacent a pair of the links and being fixed to one of the platform and support means, and means detachably connecting the lock member to a link member in either position of the platform means.

3. A luggage rack as claimed in claim 2 including stop means on each lock member interposed in the path of travel of each link of each pair of links to limit their movement, and thus the movement of the platform means, between the rear and forward positions.

4. A luggage rack as claimed in claim 1 wherein the locking means comprise a lock member fixed on each side of platform means and lying adjacent a pair of the links, a hole in the lock member, a hole in each link of the pair of links lying adjacent each lock member, the hole in each lock member being aligned with the hole in the rear link of each link pair when the platform means is in its rear position, and the hole in each lock member being aligned with the hole in the front link of each link pair when the platform means is in its front position, and detachable fastening means adapted to cooperate with the aligned holes in either position of the platform means to lock the platform means in place.

5. A luggage rack as claimed in claim 4 including a first stop element on each lock member to cooperate with the rear link of each pair to align the hole in the lock member with the hole in the rear link, and a second stop element on each lock member to cooperate with the front link of each link pair to align the hole in the lock member with the hole in the front link.

6. A luggage rack as claimed in claim 1, 2, or 5, wherein the front and rear links of each pair are slightly bent and the front links comprise removable fastening pivot means so that they may be removed from the platform means and support means, then inwardly oriented with respect to the rear links and lastly fastened again onto the platform means and support means.

* * * * *